United States Patent

[11] 3,543,899

| [72] | Inventors | William H. Colbert<br>0;<br>Derald H. Kraft, Canton, Ohio |
|---|---|---|
| [21] | Appl. No. | 740,254 |
| [22] | Filed | June 26, 1968 |
| [45] | Patented | Dec. 1, 1970 |
| [73] | Assignee | Gulf & Western Industrial Products Company<br>Grand Rapids, Michigan<br>a corporation of Delaware. |

[54] DRIVE ARRANGEMENT FOR CLUTCH OR BRAKE
4 Claims, 3 Drawing Figs.

[52] U.S. Cl..................................................... 192/107,
192/70.2; 64/23.5; 287/52.05
[51] Int. Cl...................................................... F16d 13/68
[50] Field of Search........................................... 192/70.19,
70.2, 107, 110(B); 64/10, 23.5; 188/218(axial);
192/29; 287/53(long key), 52.05

[56] References Cited
UNITED STATES PATENTS

| 1,026,437 | 5/1912 | Gustafson................... | 192/29 |
| 2,157,838 | 5/1939 | Warner...................... | 287/52.05 |
| 3,250,349 | 5/1966 | Byrnes et al. ............... | 287/52.05X |
| 1,524,294 | 1/1925 | Drake et al. ................ | 192/70.2 |
| 2,276,276 | 3/1942 | Livingston.................. | 192/70.2 |
| 2,729,319 | 1/1956 | Friedman.................... | 192/70.2X |

Primary Examiner—Benjamin W. Wyche
Attorney—Meyer, Tilberry and Body

ABSTRACT: A drive connection between a rotatable hub and a disc wherein the hub has circumferentially spaced recesses around the outside periphery and the disc has corresponding recesses around the inside periphery, one set of recesses being of a lesser radial depth than the other. A cylindrical pin is fitted tightly into one set of recesses and loosely fitted into the other, thereby allowing sliding movement of the disc relative to the hub while restraining any relative rotation.

Patented Dec. 1, 1970

3,543,899

INVENTORS
WILLIAM H. COLBERT
DERALD H. KRAFT
BY
Meyer, Tilberry & Body
ATTORNEYS.

3,543,899

DRIVE ARRANGEMENT FOR CLUTCH OR BRAKE

This invention relates to the art of clutches and brakes and, more particularly, to a driving pin arrangement for disk-type clutches or brakes.

The use of various types of disks in clutches and brakes is well known. One common arrangement is to support the disk on a splined shaft whereby the disk is secured for unitary rotation with the splined shaft but the disk may slide axially along the splines relative to the shaft. This construction has proven generally satisfactory in a broad range of applications although certain problems have been experienced with this arrangement in low inertia clutches and brakes.

In low inertia clutches and brakes where relatively thin disks are employed, the production of splined driving shafts and disks is relatively expensive. Moreover, the male splines on the thin disks frequently deform under the operating conditions to which they are subjected and thereby inhibit the necessary axial movement of the disk along the shaft to engage the brakes or clutch. As the deformation progresses, the sliding fit between the disk and the shaft frequently deteriorates until a pounding condition exists which, in turn, causes even more deformation until the disk must be replaced.

It is the primary object of this invention to provide an improved drive arrangement for low inertia clutch or brake disks which eliminates the above-described problem.

More specifically, it is an object of this invention to provide a drive arrangement for a disk clutch or brake in which an axially shiftable disk is supported over a shaft by hardened pins which comprise the drive connection between the shaft and the disk.

Still more specifically, this invention contemplates a rotatable shaft having a hub secured thereto with a plurality of circumferentially spaced recesses formed in the periphery of the hub. An annular disk is adapted to be received over the shaft with a corresponding number of circumferentially spaced recesses formed in the inner periphery of the disk. A plurality of hardened driving pins are provided with a portion of each pin disposed in a recess in the hub and the remaining portion of the pin received in the corresponding recess in the inner periphery of the hub of the disk. The pins couple the disk to the hub and shaft for unitary rotation while permitting the disk to slide axially of the shaft.

Other features and aspects of the invention will become more apparent upon a complete reading of the following description which, together with the attached drawings, discloses but one preferred embodiment of the invention.

Referring now to the drawings wherein like reference numerals indicate like parts in the various views.

Figure 1:
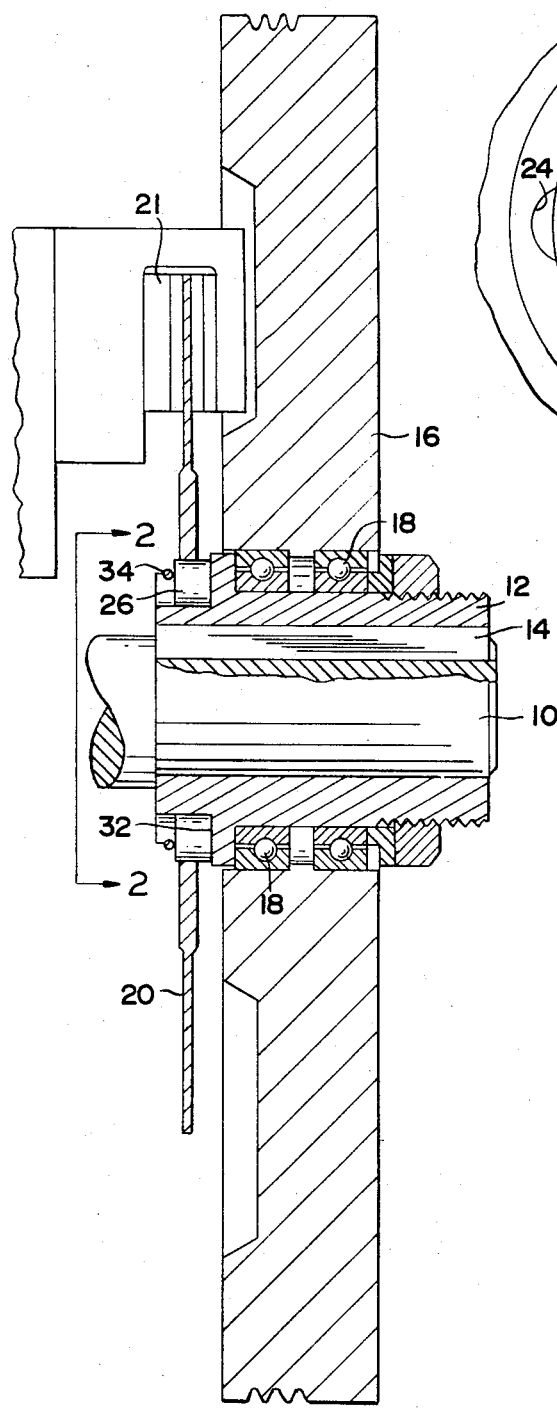
FIG. 1 is a fragmentary sectional view of a drive arrangement incorporating the principles of this invention.

Referring now to FIG. 1, there is illustrated one arrangement in which the invention may be employed. It is to be understood that this arrangement is for purposes of illustration only and is not intended to be limiting since it will be apparent to those having skill in the art that the invention may be employed in other environments as well.

As illustrated in FIG. 1, a rotatable shaft 10, which may comprise a drive shaft of a press, is rotatably supported by appropriate means in a frame or other rigid support, not shown. A hub 12 is secured by a key 14 to the shaft 10 for rotation therewith. A flywheel 16 may be supported by bearings 18 on the hub 12 for rotation relative to the shaft 10. A suitable clutch, not shown, may be employed to couple the flywheel to the shaft.

As shown in FIG. 1, a friction disk 20 forms a part of a brake for the shaft 10. This brake may take many forms but, as illustrated, the disk 20 is adapted to engage friction surface 21 on a housing secured to a frame. Engagement of the disk 20 with the friction surfaces requires axial movement of the disk 20 relative to the longitudinal axis of the shaft 10 by appropriate actuating means, not shown. This invention is concerned with accommodating the axial movement of the disk 20 relative to the longitudinal axis of the shaft 10 while restraining the disk for rotation with shaft 10.

Figure 2:
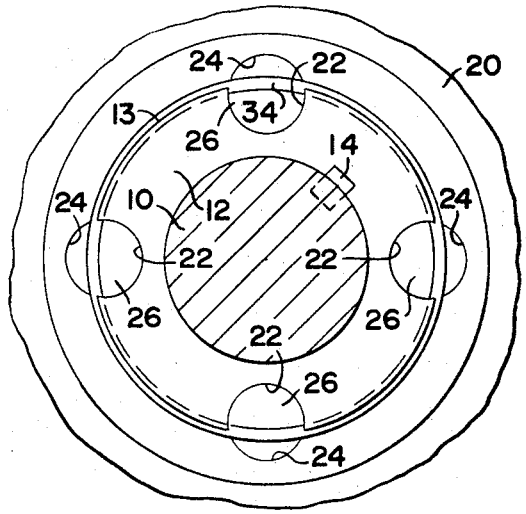
FIG. 2 is an end elevation view taken along line 2-2 of FIG. 1.

Referring now to FIG. 2, there is illustrated the driving connection between the hub 12 and the disk 2. Thus, as is apparent from this FIG., a plurality of circumferentially spaced substantially semicircular or arcuate recesses 22 are formed in the outer periphery of the hub 12. A corresponding number of similar recesses 24 are formed in the inner periphery of the opening in the annular disk 20. Adapted to be received in the recesses 22, 24 are pins 26 which serve to interconnect the disk 20 with hub 12 for unitary rotation.

Figure 3:
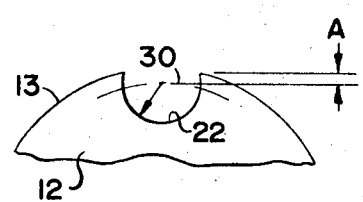
FIG. 3 is a fragmentary view of the hub illustrating one of the recesses formed in the hub.

The relationship between the pins, the recesses in the hub and the recesses in the disk 20 is important. The recesses 22 are machined to provide a close fitting relationship with the pins 26. The machining of these recesses may be simply performed by drilling a bore having a longitudinal axis parallel to the axis of the shaft 10. It is preferable that the centerline or axis of each recess 22 falls radially within the outer periphery of the hub 12. This relationship is schematically illustrated in FIG. 3 wherein it is apparent that the centerline 30 of the recess 22 lies radially inward of the periphery 13 of the hub 12 by an amount A. In this manner, the pins 26 may be inserted longitudinally in the recesses 22 and be prevented from falling out of the recess due to the partial encirclement thereof while yet exposing a sufficient portion of the surface of the pin to be received in the recess 24 in the disk 20. In other words, the walls of recesses 22 encircle more than 180° of the periphery of each pin.

The pins 26 are restrained from axial movement in one direction by the end wall 32 of the recess 22. Axial movement of the pins in the opposite direction may be restrained by a retaining ring 34 or other appropriate means.

Distinguished from the tight fit of the pins 26 in the recesses 22 is the relationship between the pins and the recesses 24. This relationship contemplates a slip fit between the pins and the recesses 24 thereby permitting the disk 20 to slide axially of the pins while yet being restrained for unitary rotation with the hub 12 and shaft 10.

It is contemplated that the pins 26 will be made of hardened precision ground stock thereby minimizing wear of the pins and eliminating the pounding action referred to hereinabove. The use of four pins equally spaced as shown in FIG. 2 is particularly desirable since stresses are thereby equally distributed and concentration of stresses such as would occur with a single pin is eliminated. However, the particular size, number and location of the pins may vary depending on design conditions and torque requirements.

It will be appreciated that the described drive connection between an axially slidable disk and a shaft fully accomplishes the objects set forth above. The drive arrangement between the shaft and the disk is characterized by its simplicity of construction and is economical to produce with only drilled holes and round stock being required. Moreover, the relationship between the pins and the hub is such that the component parts, once assembled, are essentially integral but may be readily disassembled.

Modifications and alterations will suggest themselves to those having ordinary skill in the art and it is contemplated that such modifications and alterations are to be included within the scope of the invention as defined by the appended claims.

We claim:

1. In combination, a rotatable shaft, a hub secured for rotation with said shaft and an annular disk received over said hub, the improvement comprising, a plurality of circumferentially spaced, radially outwardly open arcuate recesses formed in the outer periphery of said hub, a plurality of radially inwardly open arcuate recesses formed in the inner periphery of said disk radially opposite said radially outwardly open recesses in said hub, the recesses in one of said disk and hub being radially deeper than the other, cylindrical pin means disposed in said opposed recesses in said hub and disk whereby said disk is secured for unitary rotation with said hub and axial sliding movement longitudinally of said hub, and the walls of said recesses in said one of said disk and hub extending circumferentially of said cylindrical pin means more than 180° of the peripheral surface thereof.

2. The improvement of claim 1, wherein the longitudinal peripheral surface of each said pin means is tightly fitted in one of said recesses in said one of said disk and hub and has a slip fit relationship with one of said recesses in the other of said disk and hub.

3. The improvement of claim 2, wherein the longitudinal axis of said arcuate recesses in said one of said disk and hub lie radially inward of the outer periphery of said hub, whereby the walls of said recesses in said hub extend circumferentially of said cylindrical pin means more than 180° of the peripheral surface thereof.

4. The improvement of claim 2, wherein said pin means are hardened.